United States Patent
Shiragami

(10) Patent No.: US 7,599,791 B2
(45) Date of Patent: Oct. 6, 2009

(54) SPOT SEARCHING DEVICE, NAVIGATION APPARATUS, SPOT SEARCHING METHOD, SPOT SEARCHING PROGRAM, AND INFORMATION RECORDING MEDIUM HAVING SPOT SEARCHING PROGRAM

(75) Inventor: Noriyuki Shiragami, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 557 days.

(21) Appl. No.: 11/587,970

(22) PCT Filed: Apr. 6, 2005

(86) PCT No.: PCT/JP2005/006770
§ 371 (c)(1), (2), (4) Date: Oct. 30, 2006

(87) PCT Pub. No.: WO2005/106392
PCT Pub. Date: Nov. 10, 2005

(65) Prior Publication Data
US 2008/0249707 A1    Oct. 9, 2008

(30) Foreign Application Priority Data
Apr. 30, 2004    (JP) ............................. 2004-136181

(51) Int. Cl.
*G01C 21/00*    (2006.01)

(52) U.S. Cl. .................................... 701/209

(58) Field of Classification Search ............... 701/200, 701/208–209, 211; 707/3
See application file for complete search history.

(56) References Cited

U.S. PATENT DOCUMENTS

| 6,922,633 | B2 * | 7/2005 | Takenaka ..................... 701/209 |
| 2005/0050036 | A1 * | 3/2005 | Araki ............................ 707/3 |
| 2007/0198176 | A1 * | 8/2007 | Endo et al. .................. 701/208 |
| 2007/0219716 | A1 * | 9/2007 | Shiragami ................... 701/210 |

FOREIGN PATENT DOCUMENTS

| JP | 10-307833 A | 11/1998 |
| JP | 2001-050768 A | 2/2001 |
| JP | 2001-083988 A | 3/2001 |
| JP | 2001-109773 A | 4/2001 |
| JP | 2002-107153 A | 4/2002 |

* cited by examiner

*Primary Examiner*—Yonel Beaulieu
(74) *Attorney, Agent, or Firm*—Sughrue Mion, PLLC

(57) ABSTRACT

Enabling a partial update of data for spot search and improvement of update operation efficiency.

The data for spot search is constituted by (a) a plurality of spot search files RF-k having constitutional elements of POI data, (b) a menu display file MNF for displaying a search screen, and (c) an area table TBL. When periphery search is carried out, a mesh code where a spot on map designated by a user belongs is specified on the basis of the menu display file MNF and a search key containing the mesh code is generated. Further, the spot search file RF-k corresponding to the search key is specified on the basis of the area administration table TBL and extracts POI data corresponding to a facility, existing in a periphery of a spot which is designated by the user, is extracted out of the POI data contained in the spot search file RF-k.

7 Claims, 6 Drawing Sheets

SPOT SEARCHING DEVICE, NAVIGATION APPARATUS, SPOT SEARCHING METHOD, SPOT SEARCHING PROGRAM, AND INFORMATION RECORDING MEDIUM HAVING SPOT SEARCHING PROGRAM

TECHNICAL FIELD

The present invention particularly relates to a technology of spot searching apparatus for searching a spot on map in a navigation apparatus of searching a traveling route of a movable body and presenting the path to a user.

BACKGROUND ART

Heretofore, a variety of so-called navigation apparatuses, which are equipped in a movable body such as a vehicle, displays a traveling route, a present position and so on of the movable body, and guides the movable body, have been provided. Among this kind of navigation apparatus, there is a one having a spot searching function of recording spot searching data including information (hereinafter referred to as "spot information") such as latitude and longitude, address, and telephone number concerning facilities and spots (hereinafter referred to as "spot") along with map data for displaying maps on a display, and realizing a spot searching function of searching spot information of a spot as a destination in response to an input operation by a user. (for example, vide Patent Document 1)

Further, among this kind of the navigation apparatuses, there is a one having a function of recording data for searching the above spot and data for displaying map onto a rewritable recording medium such as such as a hard disk and update various data recorded in the navigation apparatus to the newest data.

Patent Document 1: Japanese Unexamined Patent Publication No. 2001-109773

DISCLOSURE OF THE INVENTION

Problems to be Solved by the Invention

Meanwhile, in the above navigation apparatuses, data obtained by describing spot information corresponding to all spots existing inside a target area for searching spot are utilized as spot searching data. For example, when a navigation apparatus is to guide a movable body all around Japan, areas to be searched extend to all over Japan. Therefore, spot information corresponding to all spots all over Japan is described in one file.

Therefore, update of the entire file is required in updating spot searching data, and it is impossible to partly update the spot searching data. Further, when the entire file is updated, the update operation becomes vexatious because a long time is required in updating the data.

The present invention is made in consideration of the above described situation. As an example of object of the present invention, the present invention is to provide a spot searching device, a navigation apparatus, a spot searching method, a spot searching program, and an information recording medium having the spot searching program recorded in it, which are enabled to partly update the map searching data and improve efficiency of update operation.

Means for Solving the Problem

In order to solve the above-mentioned problem, according to the first aspect of the invention, there is provided a spot searching device according to claim 1 that makes a map display on a display apparatus and searches a spot or a building, existing in a periphery of a spot which is designated on the map, in use of spot search files which are provided with respect to areas, obtained by dividing a region of the map to be displayed into predetermined areas, the spot searching apparatus including, with respect to a plurality of unit regions obtained by dividing the region of map:

a first recording means having a plurality of spot search files including elements of: (a) spot information related to various spots which exist inside a first unit region contained in the area, and (b) spot information corresponding to various spots belonging to both of the area and an adjacent area thereto, the spots existing inside a second unit region where a border of the area belongs;

a second recording means that records an administration table with an identification code for identifying the first and second unit regions stored in it, which regions are allocated to the spot search files in correspondence with file information for identifying the above various spot search file;

an acquisition means for acquiring designation information indicating at least the spot on the map;

a code specifying means for specifying an identification code corresponding to the unit regions where the spot designated by the designated information belongs;

a file specifying means which specifies the spot search file corresponding to the identification code thus specified on the basis of the administration table; and a spot extracting means which extracts the spot information of the spot, existing in a periphery of the spot corresponding to the designation information, out of the spot search file thus specified.

Further, in another aspect of the present application according to claim 5, there is provided a navigation apparatus having a spot searching device which makes the display apparatus display a map, divides a region of map to be displayed into a predetermined areas, uses the spot search files provided with respect to each of the areas to search a spot existing in a periphery of the spot designated on the map, the navigation apparatus including, with respect to a plurality of unit regions obtained by dividing the region of map:

a first recording means having a plurality of spot search files including elements of: (a) spot information related to various spots which exist inside a first unit region contained in the area, (b) spot information corresponding to various spots belonging to both of the area and an adjacent area thereto, the spots existing inside a second unit region where a border of the area belongs, a second recording means that records an administration table with an identification code for identifying the first and second unit regions stored in it, which regions are allocated to the spot search files in correspondence with file information for identifying the above various spot search file;

an acquisition means for acquiring designation information indicating at least the spot on the map;

a code specifying means for specifying an identification code corresponding to the unit regions where the spot designated by the designated information belongs;

a file specifying means which specifies the spot search file corresponding to the identification code thus specified on the basis of the administration table;

a spot extracting means which extracts the spot information of the spot, existing in a periphery of the spot corresponding to the designation information, out of the spot search file thus specified;

a route setup means for setting up a route on the basis of the spot information thus extracted; and a guide means for guiding on the basis of the route thus set up.

Furthermore, in another aspect of the present application according to claim 6, there is provided a spot searching means in a spot searching device for administrating various data with respect to area obtained by dividing a region of map to be displayed, the spot searching device, with respect to a plurality of unit regions obtained by dividing the region of map, including:

a first recording means having a plurality of spot search files including elements of: (a) spot information related to various spots which exist inside a first unit region contained in the area, (b) spot information corresponding to various spots belonging to both of the area and an adjacent area thereto, the spots existing inside a second unit region where a border of the area belongs; and a second recording means that records an administration table with an identification code for identifying the first and second unit regions stored in it, which regions are allocated to the spot search files in correspondence with file information for identifying the above various spot search file, wherein the spot searching method comprising:

a first step by the spot searching device of acquiring designation information for designating at least a spot on the map;

a second step by the spot search file of specifying an identification code corresponding to the unit region where the spot indicated by the designation information belongs;

a third step by the spot search file of specifying the spot search file corresponding to the identification code thus specified on the basis of the administration table; and a forth step by the spot search file of extracting the spot information of the spot, existing in a periphery of the spot corresponding to the designation information, out of the spot search file thus specified.

Furthermore, in another aspect of the present application according to claim 7, there is provided a spot searching program that makes a computer display a map, divides a region of map to be displayed with respect regions, and searches a spot of map existing in a periphery of a spot designated in use of spot search files which are provided with respect to the areas, the spot searching program making the computer function as:

an acquisition means for acquiring at least designation information indicative of the spot on the map;

a code specifying means for specifying an identification code for identifying a plurality of unit regions, obtained by dividing the region of the map to be displayed, the identification code corresponding to the unit region where the spot indicated by the designation information belongs;

a file specifying means for specifying (A) a plurality of spot search files having, as these elements, spot information related to various spots existing inside a first unit region contained in the area and spot information corresponding to various spots which exist inside a second unit region where a border of the area belongs and belong to both of the area and an area adjacent thereto, and (B) the spot search file corresponding to the identification code, which is specified by the code specifying means after reading out an administration table having the identification code corresponding to the first and second unit regions, which are allocated to the spot search file in correspondence with the file information for identifying each of the spot search files, out of the recording medium where the administration table is recorded; and a spot extracting means for extracting the spot information of the spot existing in a periphery of a spot corresponding to the designation information out of the spot search file thus specified.

Furthermore, in another aspect of the present application according to claim 8, there is provided an information recording medium having the spot searching program according to claim 7 recorded in it.

EXPLANATION OF NUMERICAL REFERENCES

MPF . . . MAP FILE
MNF . . . MENU DISPLAY FILE
Rf-k (k=1, 2, . . . , n) . . . SPOT SEARCH FILE
TBL . . . AREA ADMINISTRATION TABLE
100 . . . NAVIGATION APPARATUS

Best Mode For Carrying Out The Invention

[1] Embodiment

[1.1] Structure of Embodiment

Figure 1:
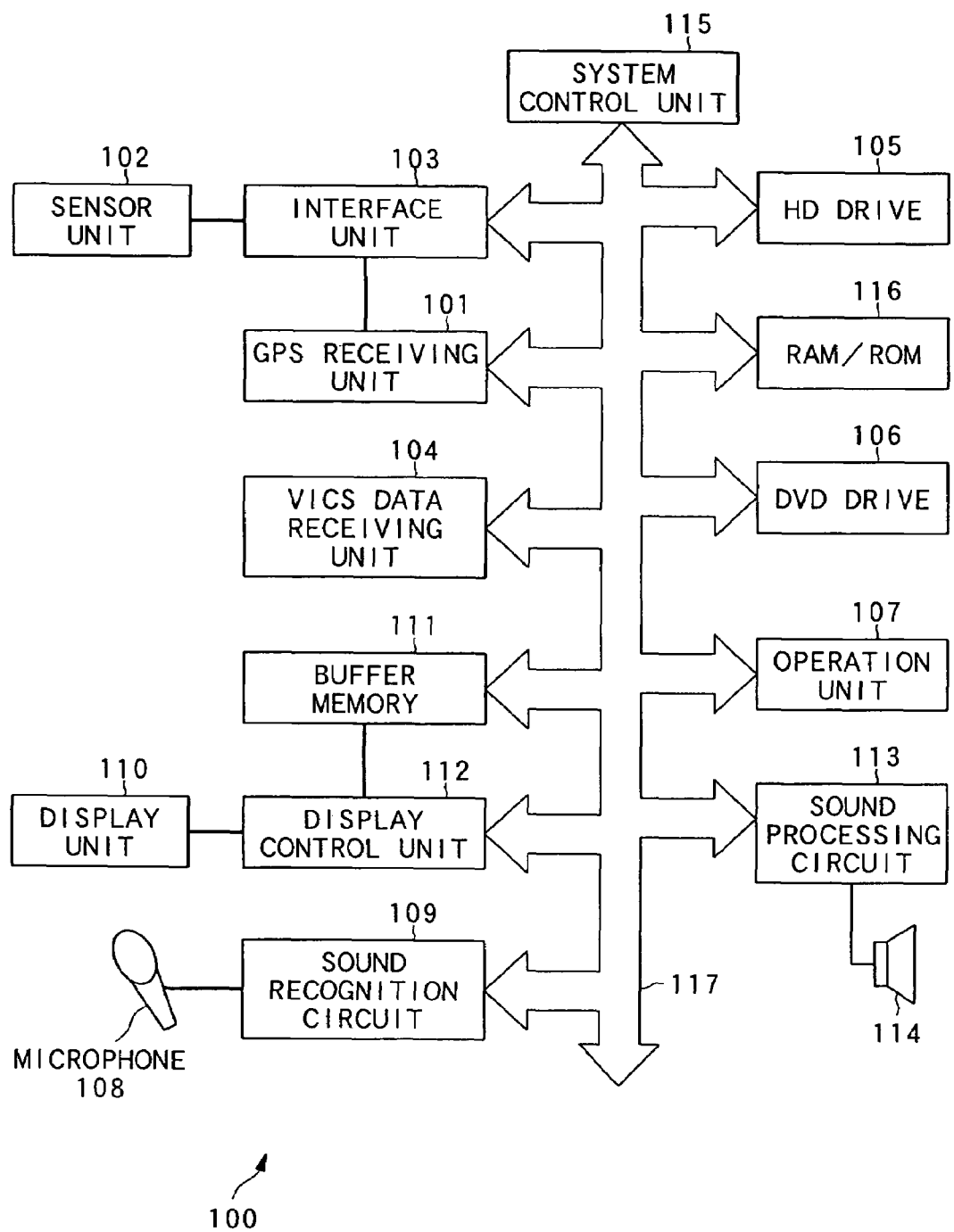
[FIG. 1] A block chart for showing an example of a concrete structure of the navigation apparatus 100 which utilizes the spot searching device and spot searching method according to the embodiment.

First, in reference of FIG. 1, a structure of the navigation apparatus 100 according to the embodiment is described. As shown in the figure, the navigation apparatus 100 according to the present embodiment includes a GPS (global positioning system) receiving unit 101, a sensor unit 102, an interface unit 103 (hereinafter "interface" is referred to as "I/F"), a VICS (Vehicle Information Communication System) data receiving unit 104, an HD Drive 105, a DVD Drive 106, an operation unit 107, a microphone 108, a sound recognition circuit 109, a display unit 110, a buffer memory 111, a display control unit 112, a sound processing circuit 113, a speaker 114, a system control unit 115, a ROM (Read Only Memory)/RAM (Random Access Memory) unit 116, and a database for connecting these constituent elements each other 117. Further, "first recording means" and "second recording means" in "Scope of Claims" corresponds to, for example, an HD drive, and "acquiring means", "code specifying means", "file specifying means", and "spot extracting means" correspond to, for example, a system control unit 115.

This navigation apparatus 100 records data for displaying map and data for searching spot in an HD of the HD drive 105 and realizes a function of conducting various searches such as periphery search, genre search, and telephone number search in use of these data. The periphery search is a searching method of searching spot information related to various faculties existing in a periphery of a spot which is designated by a user on a map. The genre search is a searching method of searching on the basis of genre designated by a user. The telephone number search is a searching method conducted based on a telephone number designated by a user. In this navigation apparatus 100, a most suitable route from a present position of vehicle to a destination is calculated in use of a spot information which is searched in use of the function.

Further, in the navigation apparatus 100 according to the present invention, it is possible to realize a partial update of data for displaying map and data for searching a spot, which data are recorded in an HD, by reading out data for update from a DVD in use of the DVD drive 106.

Figure 2:
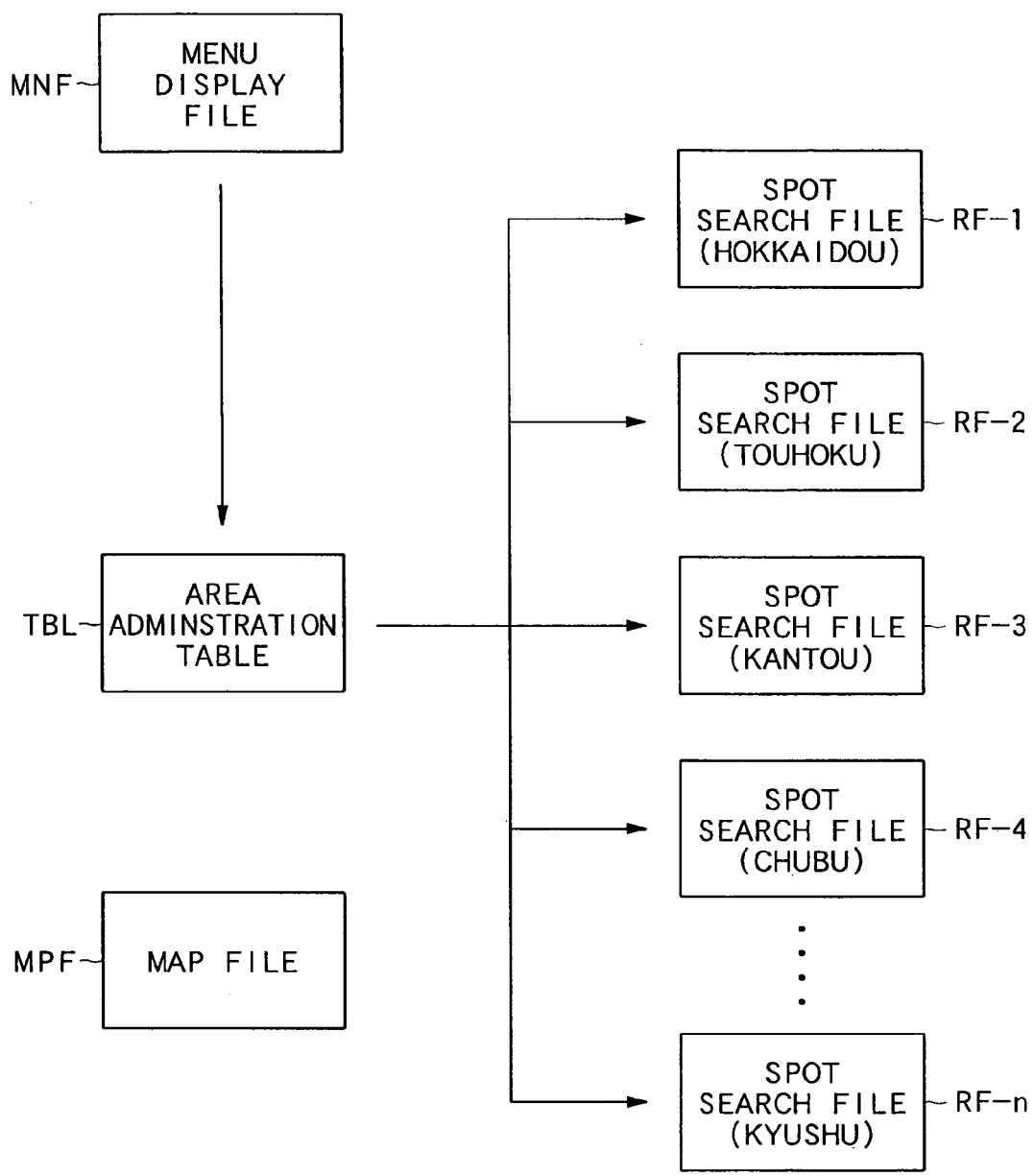
[FIG. 2] A view for showing a data structure of data that are recorded inside an HD of the navigation apparatus 100 according to the same embodiment.

In order to achieve such the function, an HD in the HD drive 105 has data for displaying map and data for searching spot which are formed as a group of a plurality of files recorded in it, as shown in FIG. 2. FIG. 2 is a schematic structure for showing a data structure of data recorded in the HD.

Among files shown in the figure, the map file MPF includes map data which are made up of map data as constitutional elements and applied as data for displaying map. The map data are made up of constitutional data such as a polygon, polyline, text, and so on for displaying a background of map and a road. The map data contained in the map file MPF are generated and administrated with respect to unit regions called a reference parcel, which is obtained by dividing a region to be displayed into gridiron. The map data corresponding to each of the reference parcels are administrated on the basis of the administration data which are provided inside the map file MPF. When a map is actually displayed in the navigation apparatus 100, the map data corresponding to the map to be displayed on the basis of the administration data is specified, and the map is displayed on the basis of the map data. Meanwhile, it is arbitrary to make map data corresponding to a map of what reduction scale include in the map file MPF. In the embodiment, map data corresponding to maps of at least reduction scales of one over two hundred thousand, one over twenty five thousand, and one over two thousand and five hundred are included.

Further, the map file MPF contains, for example, (a) road linkage and node for displaying an existing position of roads on the map corresponding to each of the reduction scales, (b) linkage ID, (c) data used in conducting map matching, (d) data used in setting up a route, and (e) road network data such as traveling conditions of each of the roads. The road linkage means a plurality of straight lines used to approximate each of the roads, and used when existing positions of each of the roads are specified on the map in map matching and a route setup process. Further, the node means end points on both sides respectively of the road linkages. By connecting each of the road linkages, the existing position of each of the roads on the map is approximated. Further, linkage ID is identification information for identifying each of the roads on the map.

On the contrary thereto, (1) menu display file MNF, (2) a plurality of spot search file RF-k, and (3) an area administration table TBL are a file group used as data for searching spot in the navigation apparatus 100.

Among these files, menu display file MNF includes, as its elements, data for displaying a search screen corresponding to various searches such as a telephone number search and data for generating a search key corresponding to a search condition which is inputted in conformity to the screen by a user.

On the contrary thereto, the spot search file RF-k is a file including data (hereinafter referred to as POI (Point of Interest) data) related to a facility and spot to be searched as its constitutional element. These POI data include information such as latitude, longitude, address, telephone number, and postal code, as the spot information. In the navigation apparatus 100, when a spot to be actual destination is searched, a search key showing the search condition designated by the user is produced on the basis of the menu display file MNF, and the POI data at a spot which matches the search condition are extracted by searching the spot search file RF-k.

Further, the spot search file RF-k includes POI data formed with respect to areas obtained by dividing a region as an object of spot search and being different with respect to each of the spot search files RF-k. For example, when the region subjected to spot searching is all over Japan, the entirety of Japan is divided into regions in units of Hokkaidou, and a plurality of other prefectures such as Touhoku, Kantou, Chubu, and Kinki, and spot search files RF-k are formed with respect to each of the regions. POI data related to the spots which exists in the regions corresponding to the spots are contained in each of the spot search files RF-k. It is arbitrary to divide the region to be searched into what sort of areas. The region may be divided into units of regions, prefectures, or municipalities.

In the embodiment, a partial update of data recorded in an HD is realized by updating at least a part of the file groups which are recorded in the HD. It is arbitrary that which file is updated in updating the files, for example only a part of the spot search files may be updated, or a map file MPF, a menu display file MNF, and so on may be updated along with the spot search file RF-k.

In this, when a structure of making a plurality of the spot search files RF-k hold the POI data corresponding to the various spots by allocating the POI data to the plurality of the spot search files, there is a possibility that versions of the various files mismatch as a result of a partial update of data in the HD. When such the mismatch of version occurs, there is a possibility that an issue of which spot search file RF-k contains the POI data that match a searching key, produced on the basis of the menu display file MNF, cannot be specified. Such the situation is, for example, in a case where the POI data corresponding to the search key which is generated on the basis of a menu display file MNF of a new version does not exist inside a spot search file RF-k of an old version. Accordingly, it becomes necessary to search the POI data which match the search key after once developing all the spot search files RF-k into ROM/RAM 116, thereby causing increment of load in processing. Therefore, in the present embodiment, an area administration table TBL is provided in the data group for searching spots.

This area table TBL is a table which stores data for specifying a spot search file RF-k which corresponds to a search key produced on the basis of the menu display file MNF. The table is updated along with the menu display file MNF. As such, by matching the version of the menu display file with that of the area administration table TBL, a spot searching file corresponding to the search key produced on the basis of the menu display file MNF can be specified.

Figure 3:
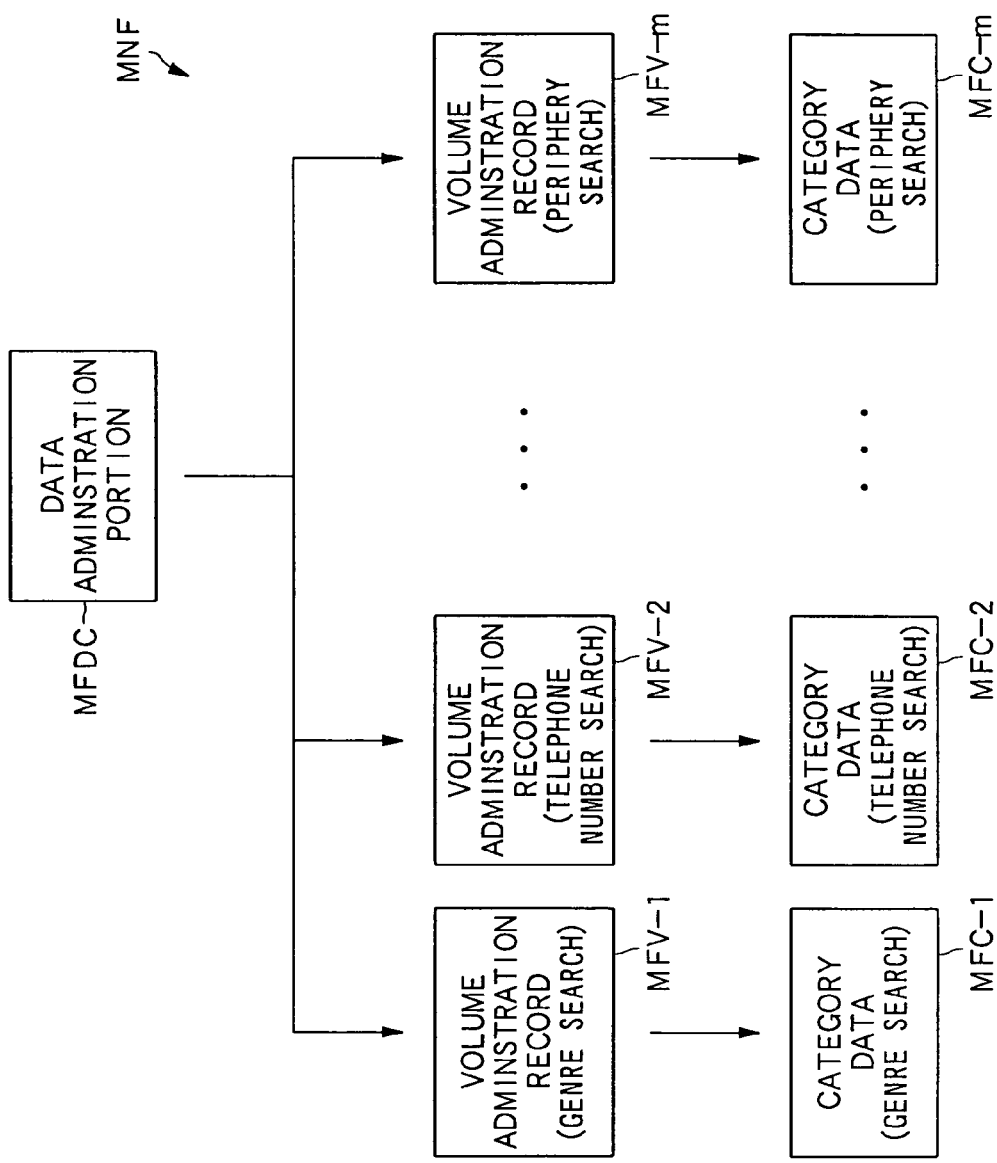
[FIG. 3] A view for showing an example of a data structure of menu display file MNF in the same embodiment.
Figure 4:
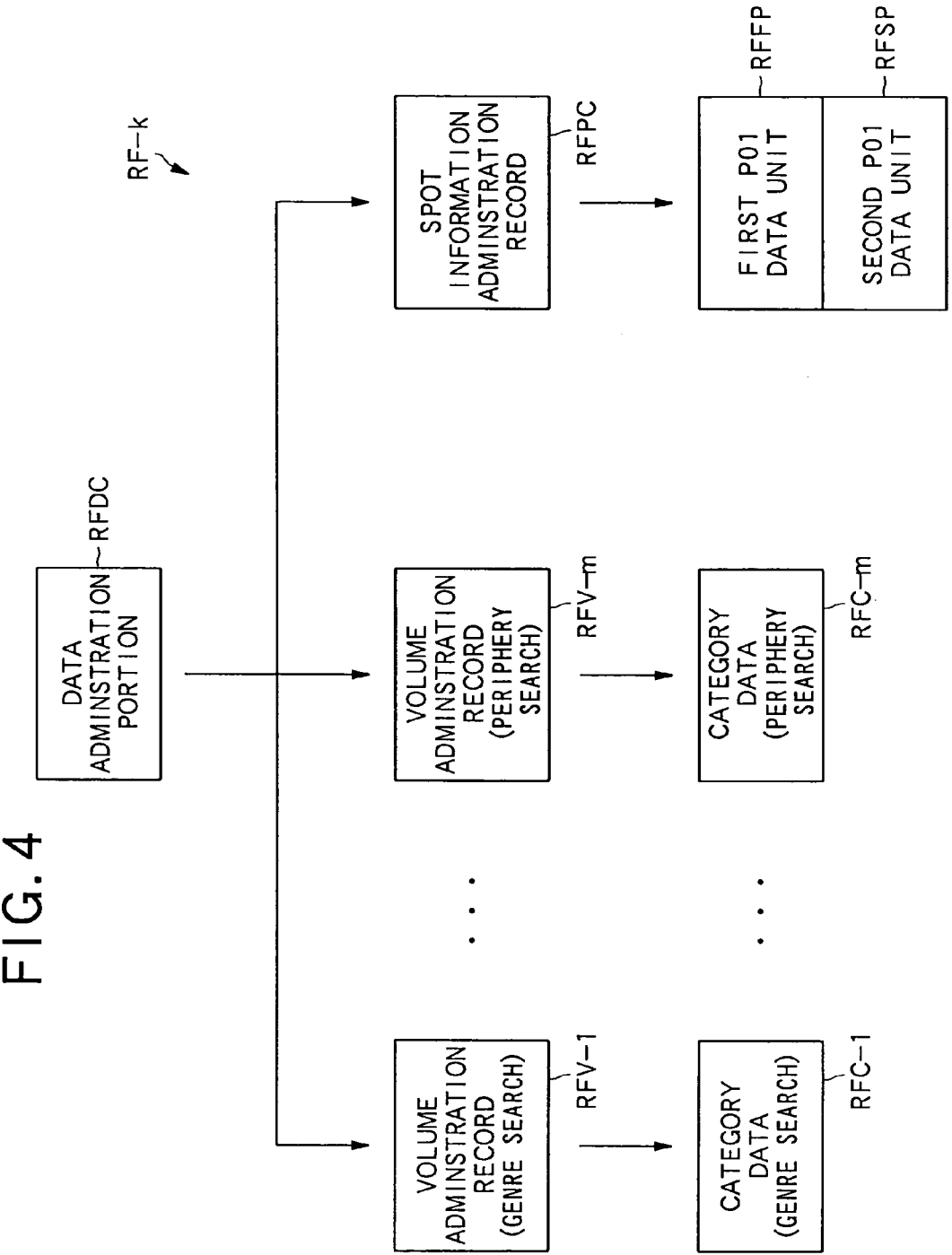
[FIG. 4] A view for showing an example of data structure of a spot search file RF-k in the same embodiment.

Hereinafter, a data structure of the files for searching spots is specifically described in reference of FIGS. 3 and 4. FIG. 3 shows an example of the data structure of the menu display file MNF according to the present embodiment, and FIG. 4 shows an example of the data structure of the spot search file RF-k according to the embodiment.

As shown in FIG. 3, the menu display file MNF is made up of a data administration unit MFDC, a plurality of volume administration records MFV-l (l=1, 2, . . . , m), category data MFC-l (l=1, 2, . . . , m) corresponding to each of the volume administration record MFV-l.

On the other hand, the spot search file RF-k is made up of data administration portion RFDC, a plurality of volume administration records RFV-l (l=1, 2, . . . , m), category data RFC-l (l=1, 2, . . . , m) corresponding to each of the volume administration record RFV-l, a spot information administration record RFPC, a first POI data portion RFFP, and a second POI data portion RFSP.

Both of the data administration portion MFDC contained in the menu display file MNF and the data administration portion RFDC contained in the spot search file RF-k are data for administrating each of the volume administration records MFV-l and RFV-l. For example, the both contain data such as a pointer (offset) for designating the volume administration records MFV-l and RFV-l. In this embodiment, "pointer" designates data for designating an address of specific data.

Meanwhile, the volume administration records MFV-l and RFV-l are records for administrating category data MFC-l and RFC-l, and contain data such as the pointer for designating the volume administration records MFV-l and RFV-l. These volume administration records MFV-l and RFV-l are provided as a separate record with respect to each of search types like periphery search, genre search, and telephone number search, wherein one volume administration record MFV-l and one volume administration record RFV-l are respectively provided with respect to one kind of the search type.

Next, the category data MFC-l and RFC-l are data provided in correspondence with each of the volume administration records MFV-l and RFV-l, the data are necessary to realize various searches such as periphery search, genre search, and telephone number search in the navigation apparatus. It is arbitrary to associate the category data MFC-l and RFC-l with the volume administration records MFV-l and RFV-l on one-to-one relationship or one-to-many relationship, and may be changed in accordance with a designing method in data creation.

Further, in the spot search file RF-k, a first POI data portion RFFP and a second PI data portion RFSP are provided along with these data. These POI data portions RFFP and RFSP include POI data as their constitutional elements and respectively contain different POI data. Specifically, in the second POI dataportion RFSP, POI data dedicated for the periphery search are contained, and in the first ROI data portion RFFP, POI data used for searching other than the periphery search such as the genre search and the telephone number search are contained.

As such, in this embodiment, there is a reason why the POI data are divided into two types of that dedicated for the periphery search and that dedicated for the other searches, as follows.

First, in the periphery search, POI data of a facility existing in a periphery of the point designated on a map by a user and matches conditions designated by the user are extracted in the periphery search. For example, when the user designates as its search condition of "gas station", the POI data corresponding to "gas station" existing within a predetermined distance range are extracted from a spot designated by the user. Therefore, in conducting the periphery search, it is necessary to first specify a position on a map corresponding to the spot designated, and simultaneously specify a facility existing within the predetermined range.

As a method of realizing such the process, there is a method of extracting POI data by making each POI data retain latitude/longitude and searching all the POI data using a search key of latitude/longitude. However, when such the method is employed, it is necessary to search all the POI data. Therefore, the process is complicated. Accordingly, there is employed a method of assuming a rectangular region (hereinafter referred to as "mesh") obtained by dicing a region subjected to spot search, allocating identification code (hereinafter referred to as "mesh code") to each of the meshes, specifying the mesh existing around the spot designated by the user, and making only the POI data existing inside the meshes a subject of search.

According to the method, since it is possible to previously limit a subject of search, it becomes possible to drastically reduce a man-hour in processing. However, it is also supposed that an area border will be changed by consolidation of municipalities when the version of data for searching spots are updated. Accordingly, it can be assumed that an area border is changed upon consolidation of municipalities when the version of data for searching the spot is updated. Accordingly, when a structure such that the POI data are allocated to a plurality of spot search files RF-k as in the embodiment and a part of the PO data is updated, there is generated a region where the POI data do not exist in the file before and after the update, thereby accurate periphery search cannot be performed. Accordingly, it becomes necessary to divide the region subjected to spot search into a plurality of areas and make all the spot search files RF-k adjacent to the border redundantly hold the POI data, existing inside a mesh where an area border belongs.

However, employment of such the structure cannot be advisability since data amount of each spot search file RF-k is brought about. Therefore, in the embodiment, it is constructed such that the mesh including the area border is forcibly allocated to any area adjacent to the border, and the POI data of a facility that exists inside the mesh are contained in any spot search file irrespective of the area border.

Figure 5:
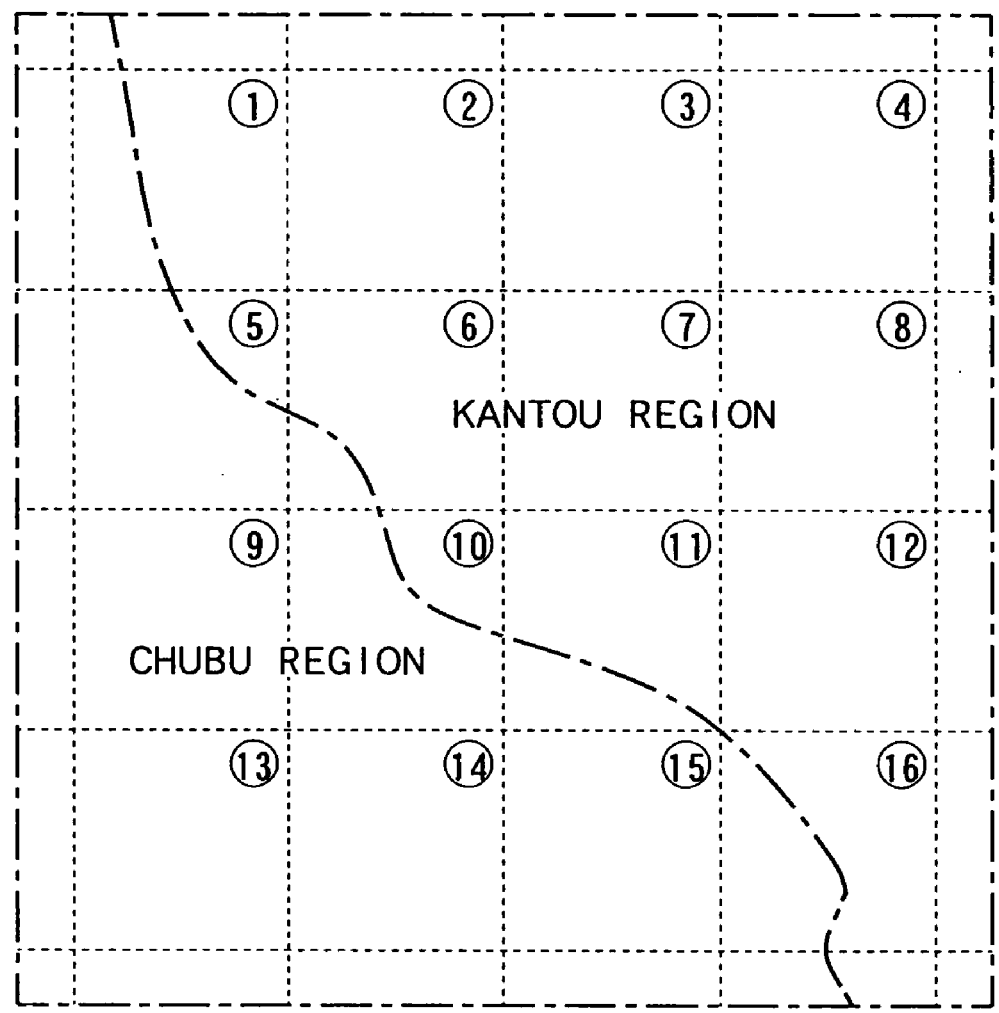
[FIG. 5] A view for schematically showing a relationship between an area border and mesh in the same embodiment.

For example, in a case shown in FIG. 5, in the meshes corresponding to mesh codes "1", "5", "6", "10", "11", and "16", the area border between "KANTOU region" and "CHUBU region" exists. In FIG. 5, mesh codes from "1" to "16" are conventionally allocated to each of the meshes. In such the case, according to this embodiment, these meshes are forcibly allocated to any of "KANTOU region" and "CHUBU region", and POI data of each of the facilities existing inside the meshes are allocated to each of the spot search files corresponding thereto. Meanwhile, it is arbitrary to allocate each of the meshes to which area. For example, it may be possible to allocate to an area having a large rate of area inside the mesh.

Meanwhile, in a search other than the periphery search, since the searches are performed on the basis of a key such as address, it is unnecessary to specify the spot search file RF-k based on a position on the map. It becomes possible to further improve accuracy of search by exactly dividing along the area border.

According to the above reason, in the embodiment of the present invention, a first POI data portion PFFP and a second POI data portion RFSP are provided inside the spot search file RF-k to make the POI data which are different with respect to these portions maintain.

It can be arbitrarily determined about which size these meshes are set up. For example, "secondary regional segment" by the Ministry of Public Management, Home Affairs, Posts and Telecommunications, Bureau of Statistics, namely "secondary mesh", is utilized and what corresponding to "secondary mesh" may be utilized as a mesh code. Further, a relationship between each of the meshes and the above basic parcel is arbitrary. For example, one mesh may be constructed by gathering a plurality of the above basic parcels. However, when if the sizes of each mesh and the mesh code are changed, a relationship is broken when discrepancy of version occurs between each of the files by a partial update of data. Accordingly, it is necessary to administrate these so that a change does not occur between each of the versions.

When a periphery search is actually conducted in use of data for spot search having the above structure, a mesh code of a mesh actually existing inside a predetermined distance range from a spot where a user has designated on the basis of category data MFC-l of menu display file MNF is specified and a search key including this mesh code is generated. Further, the spot search file RF-k corresponding to the search file is specified on the basis of the area administration table TBL.

Although a specific structure of the category data MFC-l and RF-l and the area administration data TBL are arbitrary, the following structure is employed in the present embodiment.

<Periphery Search>

When the periphery search is conducted, it is necessary to generate the search key including the mesh code as described above and specify the search key including the mesh code as above. Therefore, in the present embodiment, the category data MFC-l for periphery search of the menu display file MNF contain at least data for specifying a mesh code where a spot designated by the user in accordance with the map. Further, the area administration table TBL stores at least a mesh code corresponding to all the meshes allocated to each of the spot searching times RF-k. On the other hand, in the category data RFC-1 of the spot search file RF-k, three types of (i)data for specifying a mesh code on the basis of the search key, (ii)data for designating the search condition, and (iii) pointer for designating POI data which matches the search condition.

<Genre Search>

When the genre search is conducted, it is necessary to display menu for making a user select the genre. Accordingly, data for displaying such the menu are provided in the category data MFC-l and RFC-1. Further, when the search is conducted in the navigation apparatus 100, the search key including the genre name designated by the user is generated. Therefore, it becomes necessary to specify which file is the spot search file RF-k corresponding to the search key. Therefore, in conducting the genre search, it becomes necessary to store genre names such as "Tokyo" and "Osaka" in correspondence with information such as file names of each of the spot search file RF-k.

<Telephone Number Search>

When the telephone number is actually searched, it is sufficient to store information such as long-distance code allocated to an area corresponding to the file to the area administration table TBL in correspondence with information such as a file name of each of the spot search files RF-k. Meanwhile, as to the category data RFC-1 of the spot search file RF-k, it is necessary to provide data such as pointer for specifying the poi data corresponding to the inputted telephone number.

Hereinafter, a specific structure will be descried with respect to the constitutional elements of the navigation apparatus 100 according to the present embodiment.

The GPS receiving portion 101 receives GPS electromagnetic wave emitted from a geodetic earth orbiting satellite. On the basis of the GPS electromagnetic wave thus received, latitude and longitude corresponding to the current position of vehicle are calculated, and thus calculated latitude and longitude are outputted to the I/F unit 103 as GPS data. The sensor unit 102 has various sensors for detecting traveling speed, acceleration, and azimuthal angle, and outputs traveling data corresponding to the detected result to the I/F unit 103.

The I/F unit 103 calculates a present position of vehicle calculates the present position of vehicle on the basis of the traveling data inputted from the sensor 102 and GPS data inputted from the GPS receiving unit 101, and outputs own vehicle position data corresponding to the calculated result to the system control unit 115. The VICS data receiving unit 104 receives a broadcasting electromagnetic wave such as FM multiplex broadcasting, extracts VICS data contained in the broadcasting electromagnetic wave, and outputs these to the system control unit 115. In this, VICS designates road traffic information communication system, and VICS data designate road traffic information such as traffic jam, traffic accident, traffic regulation, or the like.

The operation unit 107 is constructed by, for example, the remote control apparatus having various keys such as a ten key and a cursor key and outputs a control signal corresponding to an input operation by a user such as a driver and a passenger to the system control unit 115. A speech sound uttered by the user and inputted into the microphone 108 is inputted into the sound recognition circuit 109. The sound recognition unit 109 analyses the uttered and inputted sound to recognize an operation command by a user and outputs a control signal corresponding to the operation command to the system control unit 115.

The display control unit 112 receives map data read out of the HD drive 105. The display control unit 112 generates image data corresponding to a map on the buffer memory 111 on the basis of the map data thus inputted, reads out the image data thus generated at a predetermined timing, and outputs these to a display unit 110. The display unit 110 may be constituted by any display device such as a CRT (Cathode Ray Tube), an organic EL (Electro Luminescent) panel, and a liquid crystal panel.

The sound processing unit 113 generates a sound signal under a control by the system control unit 115, and propagates the sound signal thus generated through the speaker 114. According to the function of the sound processing unit 113, the navigation apparatus 100 according to the embodiment notifies for example a traveling direction of a vehicle at a next intersection to a user, or notifies situation of traffic jam and closure to a user.

The system control unit 115 is mainly constituted by a CPU (Central Processing Unit) and simultaneously includes various input/output ports such as a GPS receiving port, a key input port, and a display unit control port, to thereby totally control a total function of the navigation apparatus 100 as a whole. In controlling as such, the system control unit 115 performs various processes by reading out the control program recorded in the ROM/RAM unit 116 and temporarily holds the data in the ROM/RAM unit 116 during the processing.

For example, the system control unit 115 carries out various searches such as an update process of various files recorded in the HD. Further, the system control unit 115 utilizes the POI data extracted by the search to calculate the most suitable route for a present position of vehicle to a destination, and simultaneously controls the display control unit 112 so that route guide information corresponding to the route thus set up is displayed on a map.

[1.2] Operation of the Embodiment

Figure 6:
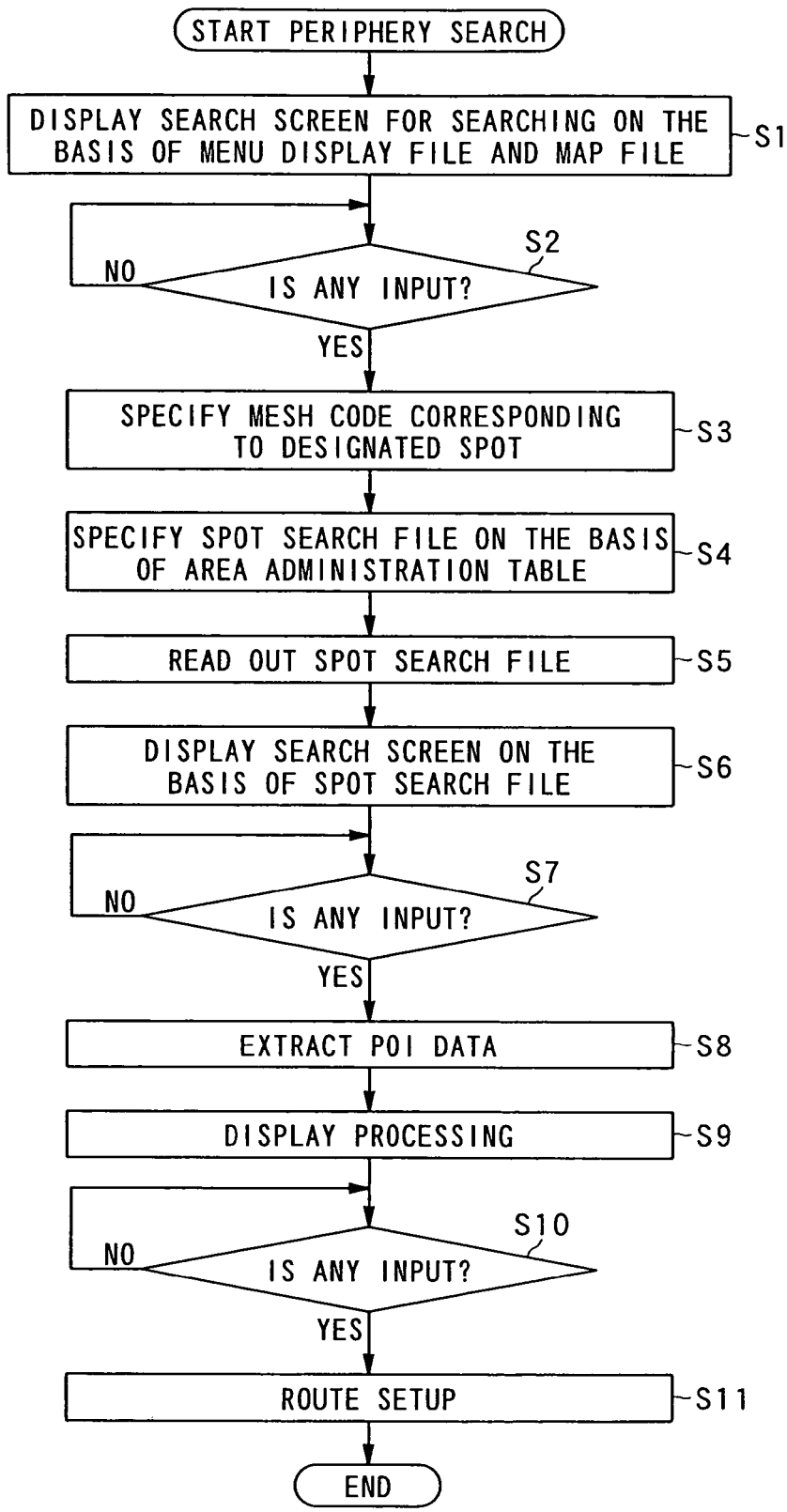
[FIG. 6] A flow chart for showing an example of process that is carried out when a system control unit 115 searches a periphery according to the same embodiment.

Next, in reference of FIG. 6, an operation of setting up the destination by searching POI data corresponding to a spot of destination in the navigation apparatus of the present embodiment is specifically described. Since a characteristic process in the embodiment is an operation of periphery search, the operation of periphery search will be described below.

First, when a spot of destination is set up by conducting a periphery search in the navigation apparatus 100 according to the present embodiment, it is necessary for a user to conduct a predetermined input operation with respect to the operation unit 104. A concrete content of operation can be arbitrarily determined. For example, a button exclusively used for a periphery search may be provided in a remote control apparatus of the operation unit 107 and a process in FIG. 6 may be started when the button is pushed down.

In the process, the system control unit 115 outputs a control signal to the HD drive 105 to make it read out the menu display file and the map file MPF to thereby control the display control unit 112 so that a search screen for periphery search is displayed on the display unit 110 (Step S1). Then a standby state waiting for a user's input is established (Step S2, "no").

At this time, the system control unit 115 extracts, for example, map data corresponding to a map around a present position of vehicle, and outputs these to the display control unit 112. At this time, the system control unit 115 generates image data on the basis of category data file contained in menu display file MNF and outputs these to the display control unit 112. As a result, image data corresponding to an image to be displayed on the display unit 110 on the basis of various data, supplied from the system control unit 115, are generated on the buffer memory 111 with the display control unit 112 and outputted to the display unit 110. Thus a character string such as "please designate a location to be searched" is displayed in a mode where the string overlaps map data on the display unit 110.

Under this situation, when the user conducts an input operation of designating a spot where a user wish to conduct periphery search, the system control unit 115 judges "yes" in Step S2, and specifies a mesh code corresponding to a mesh existing inside a predetermined distance range from the designated spot on the basis of a category data file MFC-l exclusively used for periphery search (Step S3). Specifically, the system control unit 115 specifies a mesh code, for example, existing inside a circle of 8 km from a base point, being a spot designated by a user.

As such, when the mesh code is completely specified, the system control unit 115 makes the ROM/RAM 116 memorizes the mesh code as a search key (Step S4), specifies a spot search file RF-k corresponding to the mesh code on the basis of the area control table TBL (Step S5), and outputs a control signal to the HD drive 105 to make it read out the spot search file RF-k thus specified (Step S5). At this time, the system control unit 115 reads out file information, such as file name, which is stored in correspondence with the specified mesh code out of the area control table TBL, and reads out the spot search file RF-k on the basis of the file name thus read out.

Next, the system control unit 115 generates image data corresponding to a search screen for designating, for example, attributes of various facilities to be searched as a search condition on the basis of category data RFC-l exclusively used for periphery search, which category data are contained in the spot search file RF-k thus read out, and outputs these to the display control unit 112 (Step S6). Under this state, the system control unit 115 is in a state of judging whether or not the searching condition is inputted (Step S7), and repeats the process in the step until the searching condition is inputted by a user ("no"). At this time, a structure of search screen for inputting the searching condition can arbitrarily be determined. For example, a box for inputting a keyword such as "gas station" or "convenience store" may be displayed, or a menu for selection of genre may be displayed.

In such the searching screen, when the user inputs the searching condition and completion of such the input to the operation unit 107, the system control unit 115 judges "yes" in step S7, makes the search condition thus inputted memorize into RAM/ROM 116, and extracts POI data of the facility which matches the search condition (Step S8). At this time, the system control unit 115 specifies the volume administration record RFV-l corresponding to periphery search on the basis of the data administration portion RFDC of the spot search file RF-k, and simultaneously specifies category data RFC-l designated by a pointer contained in the volume administration record RFV-l. The system control unit 115 specifies a record corresponding to a facility which matches a searching condition, designated by a user among facilities existing inside meshes corresponding to the mesh code, and extracts POI data designated by the record thus specified.

When the POI data are extracted as descried above, the system control unit 115 controls the display control unit 112 so as to display an icon for showing various facilities corresponding to the POI data, which are extracted on a map of a periphery of a present position of vehicle (Step S9). Then the system control unit 115 is in a standby state, awaiting for a user input ("no" in Step 10). At this time, the system control unit 115 extracts map data for displaying the map corresponding to the periphery of vehicle's present position, and outputs the POI data extracted in Step Sa7 along with the map data to the display control unit 112. As the result, image data for displaying a map on the display unit 110 are generated on the basis of the map data. At this time, the display control unit 112 specifies an icon which should be displayed on the map and generates image data so that the icon is displayed at a position of latitude and longitude, which is designated by the POI data.

When the icon for indicating the facilities are displayed along with the map on the display unit 110, it becomes necessary for a user to conduct an input operation for selecting a predetermined icon on the basis of such the display. When the user conducts an input operation under this state, the system control unit 115 extracts the POI data of the facility corresponding to the icon thus selected, conducts a process for setting up a route on the basis of the POI data (Step S11), and the process ends. At this time, the system control unit 115 specifies latitude and longitude corresponding to the present position of the vehicle on the basis of positional data of own vehicle which are supplied from the I/F unit 103 to perform a map matching process, and simultaneously specifies a traveling direction of the vehicle. Then the system control unit 115 calculates a route from the present position to the destination on the basis of the present position, the traveling direction, and the POI data. In such the route setup, a content to be processed by the system control unit 115 can arbitrarily be determined. For example, it may be possible to search a road network data of a map file MPF on the basis of latitude and longitude contained in the POI data, extracts a linkage ID corresponding to a road linkage existing closest to the position corresponding to the latitude and longitude, and sets up a route from the present position to the facility on the basis of the linkage ID thus extracted and the latitude and longitude which are contained in the POI data. Further, it may be possible to make the POI data hold the linkage ID corresponding to a road respectively existing closest to each of the facilities and set up a route to a destination, which is set up, from a vehicle present position on the basis of the linkage ID and the latitude and longitude.

As such, in the navigation apparatus 100 according to the present embodiment, wherein a map is displayed on the display unit 110, and simultaneously a region of map to be displayed is divided into predetermined areas, and the spot search files RF-k provided in each of the areas are used to search a spot existing in a periphery of the spot designated in the map, the navigation apparatus 100 including: the HD drive 105 having the plurality of spot search files RF-k including constitutional elements, with regard to meshes obtained by dividing a region of map to be displayed into plural numbers, (a) the POI data related to each of the spots existing inside the meshes contained in an area, and (b) the POI data corresponding to the spots belonging to both of the area and an area adjacent thereto among spots existing inside the mesh where the border of the area belongs, and the HD drive 105 also having an area administration table TBL having a mesh code for identifying the mesh allocated to the spot searching file RF-k stored in it, in correspondence with file information for identifying each of the spot searching files RF-k; and a system control unit 115 which extracts the POI data of the spot existing in a periphery of a spot corresponding to the search key out of the spot search file RF-k thus specified after acquiring at least a search key showing the spot on the map, specifying a mesh code corresponding to the mesh where the spot designated by the search key belongs, and specifying the spot search file RF-k corresponding to the mesh code thus specified on the basis of the area administration table TBL.

According to this structure, the spot search file RF-k corresponding to the spot designated by the user is specified on the basis of the area administration table TBL, and the POI data of the spot existing in the vicinity of the spot corresponding to the search key are extracted out of the spot search file RF-k thus specified. Therefore, it becomes possible to partially update data for searching spot and therefore improve efficiency of update operation. Further, according to the structure, since it is unnecessary to redundantly hold POI data corresponding to each of the spots existing inside the mesh, where the area border belongs, also in the spot search file RF-k corresponding to each of the areas adjacent to the border, a quantity of data to be recorded in the HD can be reduced.

Further, in the navigation apparatus 100 according to the present embodiment, the apparatus is constructed that the spot search file RF-k further has the category data RFC-1 indicating attribute of each of the spots as its constitutional element, and the system control unit 115 acquires a search key designating the attribute along with the mesh code to extract the POI data corresponding to the spot having the attribute which is indicated by the search key and existing in a periphery of a spot indicated by the search key in the spot search file RF-k. According to the structure, since the POI data are extracted on the basis of not only the mesh code but also the search key indicative of the attributes of the spots, it becomes possible for a user to extracts the POI data corresponding to the spot having the attribute, which is designated by the user out of the POI data corresponding to the spot existing in the periphery of spot designated by the user.

Furthermore, the navigation apparatus 100 according to the present embodiment is constituted so as to specify a mesh code corresponding to a mesh existing in a predetermined distance range from the spot along with a mesh where a spot indicated by the search key belongs, and specify a plurality of spot search files RF-k corresponding to each of the mesh codes on the basis of the area administration table TBL. Therefore, it becomes possible to extract the POI data corresponding to a spot existing inside the mesh which corresponds to a mesh existing in the periphery of a spot designated by a user and realize a detailed spot search.

Meanwhile, the navigation apparatus 100 according to the above embodiment employs a structure of searching POI data corresponding to a facility which exists in a periphery of a spot, designated by a user on a map on the basis of map data contained in the map file MPF. However, it is also possible to employ a structure of searching POI data corresponding to a facility which exists in a periphery of a vehicle's present position. In this case, Steps S1 and S2 described above in FIG. 6 are unnecessary. Then it is sufficient to specify a vehicle's present position on the basis of positional data of own vehicle which are supplied from the I/F unit 103 in Step S3, and specify a mesh code corresponding to a mesh existing inside a predetermined distance range from the present position.

Further, although the navigation apparatus 100 according to the embodiment employs a structure of displaying an icon on a map on the basis of the POI data extracted in the periphery search in Step S9 of FIG. 6, it is also possible to display a list for selecting POI data RFP-i on the basis of the POI data thus selected.

Furthermore, the above embodiment employs a structure of recording a data group for spot searching in the HD drive 105 of the navigation apparatus 100. However, these data should not be always recorded inside the navigation apparatus 100. For example, it is possible to make a part of file recorded in the HD may be held in a server on a network so as to enable download of data when necessary and perform spot search in use of the data thus downloaded. Further, for example, it is also possible to make all the data for spot searching, which are recorded on the HD, hold in a server on a network, search the POI data in the server upon request from the navigation apparatus, and send only the POI data PFP-i thus detected to the navigation apparatus 100.

Further, although a case where a periphery search is conducted with the navigation apparatus 100 for vehicle has been described, it is possible to apply the present invention to a case where a pedestrian on the move searches a destination using a portable handy phone having various files recorded in it.

Furthermore, the above embodiment employs a structure such that the DVD drive 106 is provided in the navigation apparatus 100 and the DVD drive 106 is used to reproduce the DVD with data for update recorded on it for the purpose of updating various files on the HD. However, data for update may be downloaded from a server on a network, or a device exclusively used for updating various files recorded on the HD drive may be separately prepared.

Further, in the structure of updating the file in the HD with use of the above apparatus to be exclusively used, the HD drive 105 is detached from the navigation apparatus 100 and data inside the HD may be updated with use of the apparatus to be exclusively used, or data may be updated in a state that the HD drive 105 is connected to the navigation apparatus 100.

Further, this embodiment employs a structure that various files are recorded in the HD of the navigation apparatus 100, specifies a spot search file RF-k corresponding to a spot which is designated by a user, and searches the spot search file RF-k. However, a processing operation similar to the above may be conducted by providing a recording medium with a program stipulating the operation of process recorded on it and a computer for reading the program and by reading the program with this computer.

[1.3] Modified Example

In the above example, there has been explained about a case where a periphery search is conducted by making the second POI data portion of the spot search file RF-k hold the POI data exclusively used for periphery search, and the POI data are used to conduct the periphery search. However, it is possible to realize a so-called building search for searching information related to buildings existing in a periphery of a spot, designated by a user on a map with use of the structure similar to the above.

In this case, a third POI data portion having constitutional elements of POI data exclusively used for building search is provided in the spot search file RF-k. In the POI data exclusively used for building search, information related to shops and companies located inside the buildings are described. Further, the POI data to be contained in the spot search files RF-k are controlled in units of mesh in a manner similar to a case of the periphery search, and the POI data related to buildings existing inside a mesh where an area border belongs are held in a spot search file RF-k corresponding to any area adjacent to the border. Further, by employing a structure of making mesh codes, allocated to each of the spot search files RF-k, store in the area administration table TBL, it becomes possible to specify the spot search file RF-k corresponding to the mesh, existing in the periphery of the spot which is designated by the user.

When a building is actually searched, the system control units 115 specifies a mesh code of a mesh, existing within a predetermined distance range, from a spot where a user designates on the basis of category data MFC-l of menu display file MNF, and specifies a spot search file RF-k corresponding to the mesh code on the basis of the area administration table TBL. The system control unit 115 extracts POI data related to these buildings, and displays a list for selecting POI data. At this time, the system control unit 115 describes information such as that of shop, contained in the POI data, inside the list.

As such, according to the present modified example, by allocating POI data to each of the spot search files RF-k, it becomes possible to partially update data in searching buildings.

The entire disclosure of Japanese Patent Application No. 2004-136181 flied on Apr. 30, 2004 including the specification, claims, drawings and summary is incorporated herein by reference in its entirety.

The invention claimed is:

1. A spot searching apparatus that makes a map display on a display apparatus and searches a spot or a building, existing in a periphery of a spot which is designated on the map, in use of spot search files which are provided with respect to areas, obtained by dividing a region of the map to be displayed into predetermined areas, the spot searching apparatus comprising:
   a first recording device having a plurality of spot search files including elements, with respect to a plurality of unit regions obtained by dividing the region of map, of: (a) spot information related to various spots which exist inside a first unit region contained in the area, (b) spot information corresponding to various spots belonging to both of the area and an adjacent area thereto, the spots existing inside a second unit region where a border of the area belongs;
   a second recording device that records an administration table with an identification code for identifying the first and second unit regions stored in it, which regions are allocated to the spot search files in correspondence with file information for identifying the above various spot search file;
   an acquisition device which acquires designation information indicating at least the spot on the map;
   a code specifying device which specifies an identification code corresponding to the unit regions where the spot designated by the designated information belongs;
   a file specifying device which specifies the spot search file corresponding to the identification code thus specified on the basis of the administration table; and
   a spot extracting device which extracts the spot information of the spot, existing in a periphery of the spot corresponding to the designation information, out of the spot search file thus specified.

2. The spot searching apparatus according to claim 1, wherein
   the spot searching file further has attribute information indicative of attributes of each of the spots as its elements;
   the acquisition device acquires the designation information for designating the attribute along with the spot on the map as the designation information, and
   the spot extracting device extracts spot information corresponding to the spot having the attribute information designated by the designation information, the spot existing in a periphery of the spot designated by the designation information by the search file.

3. The spot searching apparatus according to claim 1, wherein
   the code specifying device specifies an identification code corresponding to the unit region, existing inside a predetermined distance range from the spot along with the unit region where the spot designated by the designation information belongs, and
   the file specifying device specifies a plurality of spot search files corresponding to each of the identification codes on the basis of the administration table when the identification code thus identified is plural.

4. The spot searching apparatus according to claim 1, wherein
   the spot search file includes information related to a building which exists in a spot corresponding to the spot information as the spot information.

5. A navigation apparatus having a spot searching device which makes the display apparatus display a map, divides a region of map to be displayed into a predetermined areas, uses the spot search files provided with respect to each of the areas to search a spot existing in a periphery of the spot designated on the map, the navigation apparatus comprising:
   a first recording device having a plurality of spot search files including elements, with respect to a plurality of unit regions obtained by dividing the region of map, of: (a) spot information related to various spots which exist inside a first unit region contained in the area, (b) spot information corresponding to various spots belonging to both of the area and an adjacent area thereto, the spots existing inside a second unit region where a border of the area belongs,
   a second recording device that records an administration table with an identification code for identifying the first and second unit regions stored in it, which regions are allocated to the spot search files in correspondence with file information for identifying the above various spot search file;
   an acquisition device which acquires designation information indicating at least the spot on the map;
   a code specifying device which specifies an identification code corresponding to the unit regions where the spot designated by the designated information belongs;
   a file specifying device which specifies the spot search file corresponding to the identification code thus specified on the basis of the administration table;
   a spot extracting device which extracts the spot information of the spot, existing in a periphery of the spot corresponding to the designation information, out of the spot search file thus specified;
   a route setup which sets up a route on the basis of the spot information thus extracted; and a guide device which guides on the basis of the route thus set up.

6. A spot searching device in a spot searching method which administrates various data with respect to area obtained by dividing a region of map to be displayed, the spot searching device, with respect to a plurality of unit regions obtained by dividing the region of map, including:

a first recording device having a plurality of spot search files including elements of: (a) spot information related to various spots which exist inside a first unit region contained in the area, (b) spot information corresponding to various spots belonging to both of the area and an adjacent area thereto, the spots existing inside a second unit region where a border of the area belongs; and a second recording device that records an administration table with an identification code for identifying the first and second unit regions stored in it, which regions are allocated to the spot search files in correspondence with file information for identifying the above various spot search file, wherein the spot searching method comprising:

a first step by the spot searching device of acquiring designation information for designating at least a spot on the map;

a second step by the spot searching device of specifying an identification code corresponding to the unit region where the spot indicated by the designation information belongs;

a third step by the spot searching device of specifying the spot search file corresponding to the identification code thus specified on the basis of the administration table; and a fourth step by the spot searching device of extracting the spot information of the spot, existing in a periphery of the spot corresponding to the designation information, out of the spot search file thus specified.

7. An information recording medium having the spot searching program that makes a computer display a map, divides a region of map to be displayed with respect regions, and searches a spot of map existing in a periphery of a spot designated in use of spot search files which are provided with respect to the areas, the spot searching program making the computer function as:

an acquisition device which acquires at least designation information indicative of the spot on the map;

a code specifying device which specifies an identification code for identifying a plurality of unit regions, obtained by dividing the region of the map to be displayed, the identification code corresponding to the unit region where the spot indicated by the designation information belongs;

a file specifying device which specifies (A) a plurality of spot search files having, as these constitutional elements, spot information related to various spots existing inside a first unit region contained in the area and spot information corresponding to various spots which exist inside a second unit region where a border of the area belongs and belong to both of the area and an area adjacent thereto, and (B) the spot search file corresponding to the identification code, which is specified by the code specifying device after reading out an administration table having the identification code corresponding to the first and second unit regions, which are allocated to the spot search file in correspondence with the file information for identifying each of the spot search files, out of the recording medium where the administration table is recorded; and a spot extracting device which extracts the spot information of the spot existing in a periphery of a spot corresponding to the designation information out of the spot search file thus specified.

* * * * *